US008040250B2

(12) United States Patent
Ramos

(10) Patent No.: US 8,040,250 B2
(45) Date of Patent: Oct. 18, 2011

(54) RETRACTABLE SENSOR SYSTEM AND TECHNIQUE

(75) Inventor: Rogerio Tadeu Ramos, Eastleigh (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 1075 days.

(21) Appl. No.: 11/851,437

(22) Filed: Sep. 7, 2007

(65) Prior Publication Data

US 2009/0070041 A1 Mar. 12, 2009

(51) Int. Cl.
*G01V 3/00* (2006.01)
(52) U.S. Cl. ........... 340/856.2; 166/250.01; 166/250.11; 73/152.24; 367/25
(58) Field of Classification Search ............... 340/856.2; 73/152.24; 166/250.01, 250.11; 367/25
See application file for complete search history.

(56) References Cited

U.S. PATENT DOCUMENTS

| | | | | |
|---|---|---|---|---|
| 5,242,020 | A | * | 9/1993 | Cobern ................. 166/254.2 |
| 5,509,474 | A | * | 4/1996 | Cooke, Jr. ................. 166/64 |
| 5,829,520 | A | * | 11/1998 | Johnson ................. 166/250.01 |
| 6,041,860 | A | * | 3/2000 | Nazzal et al. ............ 166/250.01 |
| 6,170,573 | B1 | | 1/2001 | Brunet |
| 6,442,105 | B1 | | 8/2002 | Tubel |
| 6,965,425 | B2 | * | 11/2005 | Tanabe ................. 355/27 |
| 6,986,389 | B2 | | 1/2006 | Foster |
| 7,263,029 | B2 | | 8/2007 | Jackson |
| 7,567,485 | B2 | * | 7/2009 | Nutt et al. ............... 367/25 |
| 7,581,440 | B2 | * | 9/2009 | Meek et al. ............ 73/152.24 |
| 7,779,684 | B2 | * | 8/2010 | Meek et al. ............ 73/152.24 |
| 7,894,297 | B2 | * | 2/2011 | Nutt et al. ............... 367/25 |
| 2005/0149264 | A1 | | 7/2005 | Tarvin |

FOREIGN PATENT DOCUMENTS

WO 2007015053 2/2007

* cited by examiner

*Primary Examiner* — Albert Wong
(74) *Attorney, Agent, or Firm* — Brandon S. Clark; Rodney Warfford

(57) ABSTRACT

A technique usable with a well includes disposing a retractable line in a conduit having an open end located above a region of interest in the well. The retractable line comprises a sensing portion that, when the line is deployed, extends from the open end of the conduit and into the region of interest. Information observed by the sensing portion in the region of interest is communicated to the surface. When further well operations are to be performed in the region of interest, the retractable line is retracted until the sensing portion is located above the region of interest and below the surface. After the well operation is completed, the retractable line may be re-deployed such that the sensing portion again extends through the open end of the conduit and into the region of interest to continue observing characteristics associated with the well.

25 Claims, 5 Drawing Sheets

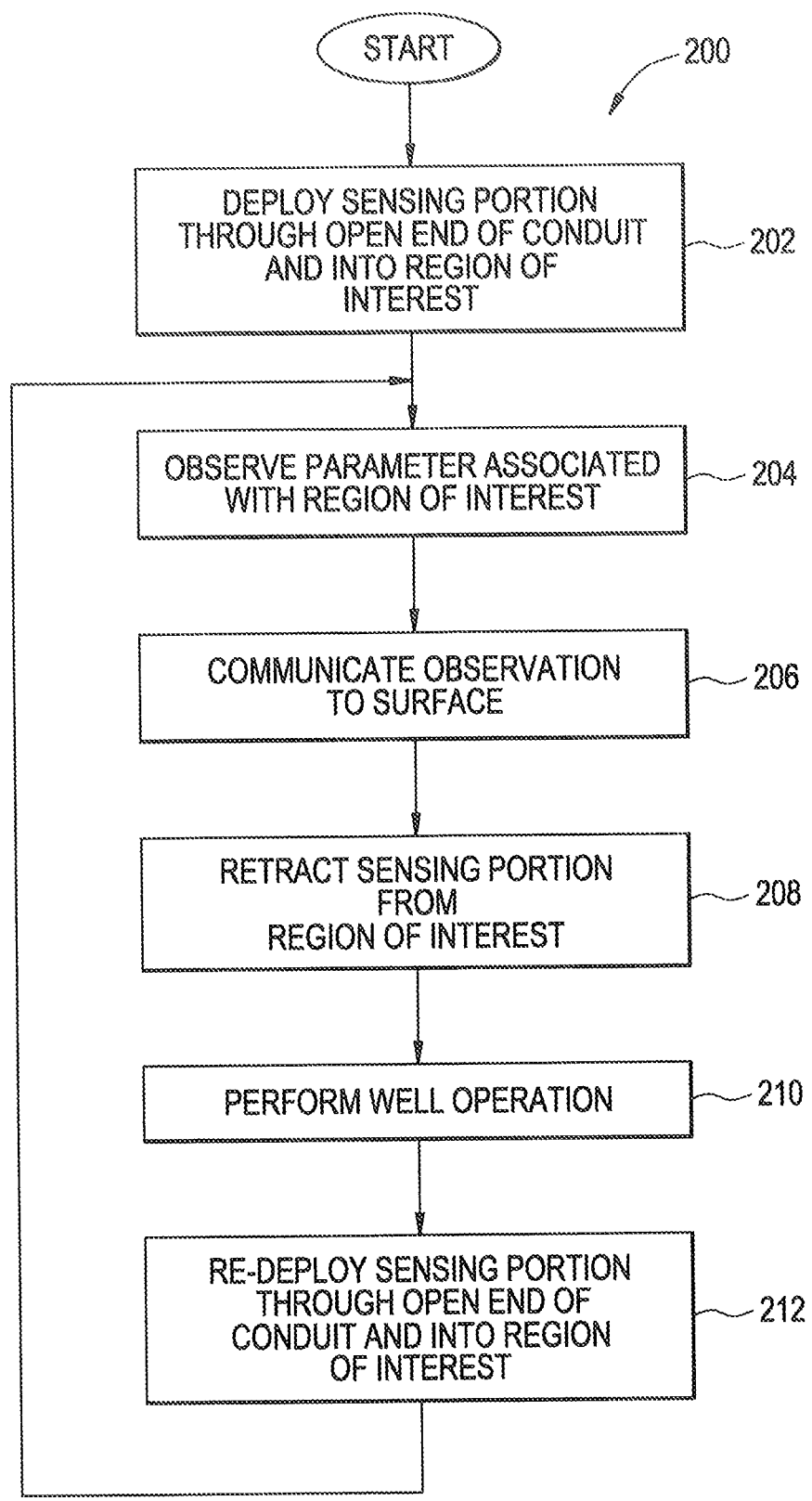

RETRACTABLE SENSOR SYSTEM AND TECHNIQUE

BACKGROUND

Oil and gas wells typically employ various types of sensor systems and other instrumentation to monitor parameters of the well that are associated with the well's production, such as temperature, pressure, etc. As the monitoring often needs to be performed in real time, sensors that are permanently installed in the well generally are employed. Although it may be possible to remove a permanently installed sensor system, such removals are costly both in the labor and expense involved. Moreover, in some instances, it may not be feasible to completely remove the sensor system. For instance, some sensing systems may incorporate an optical fiber that is used in a distributed temperature sensing (DTS) system. The optical fiber often is completely contained within a conduit, such as a control line, that traverses a region of interest in the well. In the event that the optical fiber degrades over time, the optical fiber may be pulled from the conduit for replacement. However, the conduit itself is left in the region of interest such that a replacement optical fiber may be deployed therein.

The presence of the conduit and/or the sensor system itself within the region of interest of the well may be problematic. More specifically, over the lifetime of the well, further completion operations, such as a perforation operation or a well treatment, may need to be performed in the well to optimize production. Oftentimes, the placement and connection of the permanently installed sensor systems, such as the DTS system discussed above, will interfere with the type of operation to be performed, resulting in either destruction of the existing sensor system and/or a costly removal procedure to remove and replace the sensor system. In some instances, replacement of the sensor system may not be feasible. In such cases, a choice must be made between attempting to increase production with an intervention procedure that destroys the sensor system or simply leaving the sensor system in place and accepting less than optimal production.

SUMMARY

In accordance with an embodiment of the invention, a method usable with a well comprises disposing a line having a sensing portion in a conduit that extends into the well, the conduit having an open end located above a region of interest of the well. The method further comprises extending the sensing portion through the open end and into the region of interest, using the sensing portion to observe a parameter associated with the region of interest, and communicating the observed parameter to the surface. The method also comprises retracting the line into the conduit until the sensing portion is located above the region of interest and below the surface.

In accordance with another embodiment of the invention, a retractable sensor system comprises a conduit disposed in a well, the conduit having an open end disposed above a region of interest in the well. The system also comprises a retractable line disposed in the conduit. The retractable line comprises a sensing portion to observe a parameter associated with the region of interest. When the retractable line is deployed in the conduit, the sensing portion extends through the open end and into the region of interest. When the line is retracted, the sensing portion is located above the region of interest and below the surface.

In accordance with yet another embodiment of the invention, a retractable sensor system comprises a conduit extending from a surface of a well, wherein the conduit has an open end located above a region of interest of the well, and wherein at least a portion of the conduit includes a constricted passageway. The system also comprises a retractable line disposed in the conduit, wherein the retractable line comprises a sensing portion. The system further includes a blocking device configured to engage with the first conduct at the constricted passageway. When the retractable line is deployed in the conduit, the sensing portion extends from the open end of the conduit and into the region of interest. When the line is retracted, the sensing portion is located above the region of interest and the blocking device engages with the conduit at the constricted passageway to prevent flow of production fluid from the region of interest to the surface.

Other or alternative features will become apparent from the following description, from the drawings, and from the claims.

BRIEF DESCRIPTION OF THE DRAWINGS

FIG. 5 is a flow diagram depicting a technique to use the retractable sensor system in a well in accordance with an embodiment of the invention.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
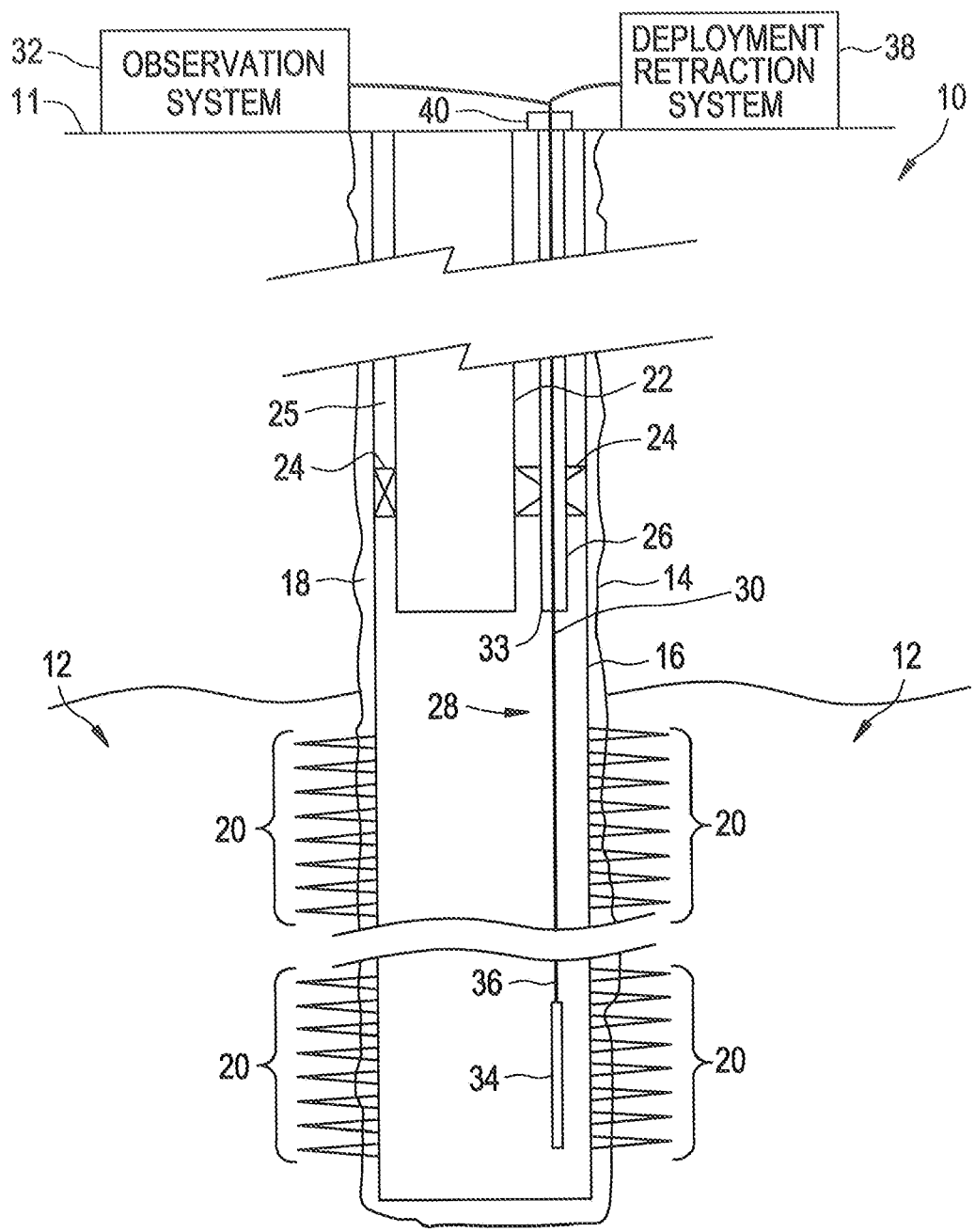
FIG. 1 is a schematic diagram of a well in which a retractable sensor system is deployed in accordance with an embodiment of the invention.

FIG. 1 illustrates an exemplary embodiment of a retractable sensor system deployed in a well 10 to observe characteristics associated with a region of interest 12. To reach the region of interest 12, a well bore 14 is drilled through a surface 11 and a casing 16 is lowered into the bore 14. An annular space 18 between the casing 16 and the bore 14 is cemented. A gun then is lowered into the well and perforations 20 are created through the casing 16 using shaped charges. The perforations 20 establish fluid communication between the well bore 14 and the formation in the region of interest 12 around the perforations 20.

A production tubing 22 is then installed and set in place using a packer 24 that seals an annular space 25 between the production tubing 22 and the casing 16. The packer 24 also seals against a control line 26. Production of fluids can then be established through the production tubing 22.

In the embodiment illustrated in FIG. 1, a retractable sensor system 28 is deployed in the well 10 to observe characteristics associated with the region of interest 12, such as temperature, pressure, sound, etc. The system 28 includes a line 30 that is disposed in a conduit, such as the control line 26, for example, although other conduits present in the well 10 also are contemplated. The line 30 includes a sensing portion 34 that is configured to observe information in the region of interest 12. In some embodiments, the line 30 may include a slickline or cable, for instance, and the sensing portion 34 of the line 30 may include one or more discrete sensors or other devices coupled to an end 36 of the slickline or cable. In other embodiments, the line 30 may include an optical fiber that provides the sensing portion 34. In such embodiments, the sensing portion 34 may be restricted to a particular portion of the line 30 or may extend along a substantial portion of the length of the line 30, particularly in embodiments in which the optical fiber is used in a distributed temperature sensing system (DTS). In yet other embodiments, the line 30 may be placed inside a control line (not shown) having a smaller diameter than the conduit 26, which is then routed through the conduit 26. In such embodiments, the smaller control line may be filled with an inert gas or fluid for purposes of protecting the line 30, particularly in applications in which the line 30 is used in a DTS system.

In some embodiments, the line 30 may be configured to communicate the information observed in the region of interest 12 to the surface 11. For instance, the line 30 may include one or more electrical conductors or an optical fiber to communicate the observed information to the surface 11. In other embodiments, the information may be communicated to the surface 11 in other manners, such as via a separate line having one or more electrical conductors or an optical fiber coupled to the sensing portion 34, wirelessly, etc.

Returning to the embodiment shown in FIG. 1, the conduit 26 extends downhole in the wellbore 14 and terminates at an open end 33 that is located above the region of interest 12. As will be explained in further detail below, terminating the conduit 26 above the region of interest 12 facilitates retraction of the line 30 to a location within the well 10 at which neither the line 30 nor the conduit 26 interfere with well operations that may be performed in the region of interest 12 after the retractable sensor system 28 has been deployed.

In the embodiment shown in FIG. 1, the line 30 is coupled to a deployment/retraction system 38 located at the surface 11 of the well 10. To deploy the line 30 into the well 10, the system 38 may include a spool that unwinds the line 30 and allows the line 30 to descend into the well 10. The system 38 also may push line 30 into the well 10. Alternatively, in embodiments in which the sensing portion 34 comprises a discrete device coupled to the end 36 of the line 30, the sensing portion 34 may further include a cable termination, weight, sensor, or set of sensors that help the line 30 to gravitate down into the well. In yet other embodiments in which the well 10 may be deviated in a manner in which gravity alone may not be sufficient to promote descent of the line 30, the line 30 may include a propulsion device or a traction device to move the line 30 into the well.

The line 30 is deployed into the well 10 such that the sensing portion 34 extends through the open end 33 of the conduit 26 and into the region of interest 12. Once positioned in the region of interest 12, the sensing portion 34, which may include one or more discrete sensor or sensor systems or a distributed sensor system, may observe various characteristics associated with the region of interest 12 (e.g., pressure, temperature, presence of certain chemicals, sound, etc.). In the embodiment shown in FIG. 1, the observations from the sensing portion 34 may be electrically or optically communicated to the observation system 32 at the surface 11 via the line 30. In some embodiments, the observations may be communicated to the surface 11 in real time. Alternatively, the retractable sensor system 28 may include a storage device to store the observations, and the stored observations may then be communicated to the surface 11 at any time, including periodically while the sensor portion 34 is deployed or any time after the sensor portion 34 is retracted.

To prevent the production of fluids from the region of interest 12 through the conduit 26, a seal 40, such as a pressure seal, for instance, may be positioned at the surface 11 to seal the annular space between the conduit 26 and the line 30. In some embodiments, other measures in lieu of or in addition to the seat 40 may be taken to minimize fluid production through the conduit 26. For instance, referring to FIG. 2, an exemplary embodiment of a conduit 26 is shown in which a blockage is placed within the conduit 26 to prevent fluid production.

Figure 2:
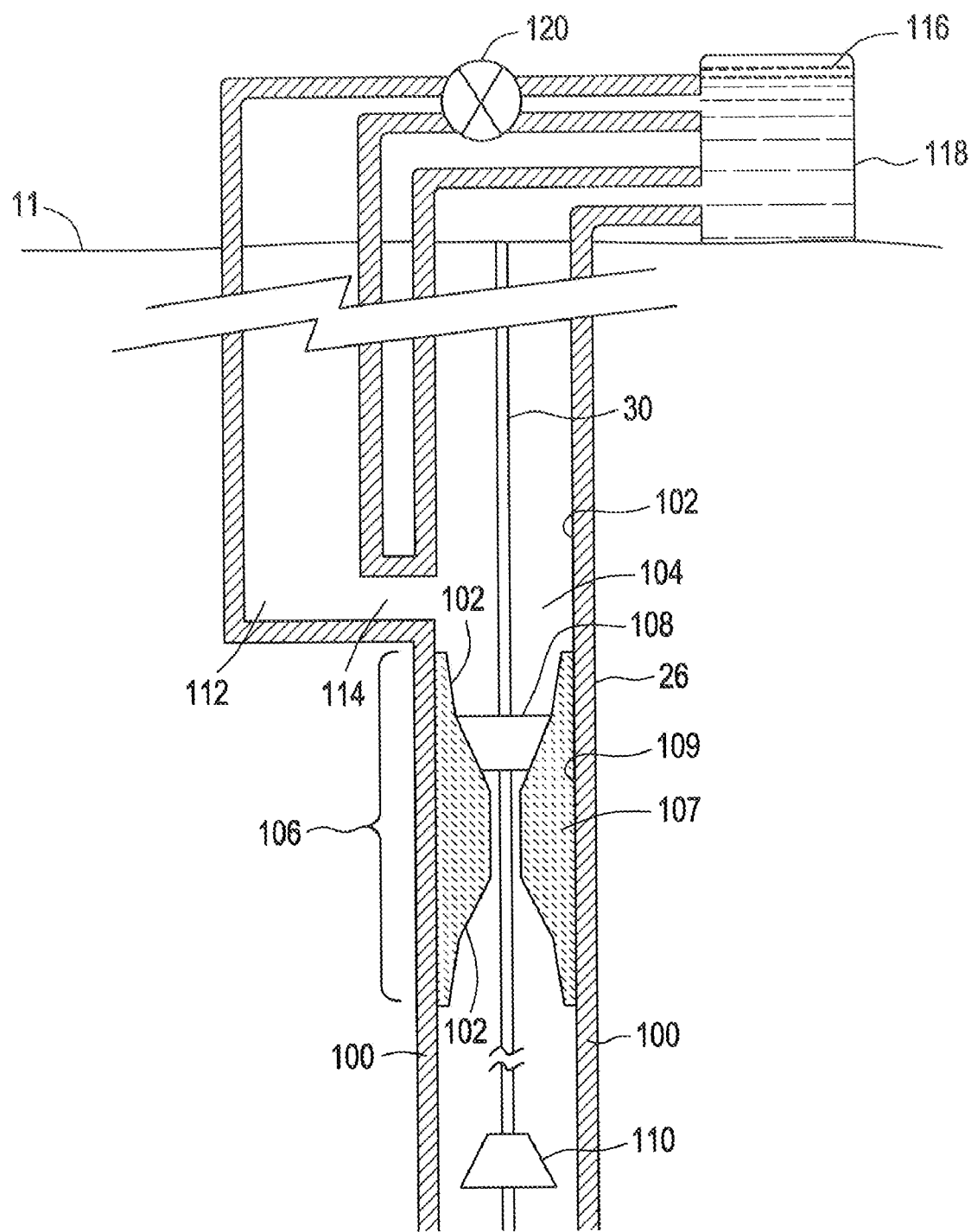
FIG. 2 is a schematic diagram of an exemplary conduit for a retractable sensor system, in accordance with an embodiment of the invention.

In the embodiment shown in FIG. 2, the conduit 26 includes a wall 100 having an inside surface 102 that defines a passageway 104. The inside surface 102 of wall 100 is configured such that the passageway 104 includes a constricted region 106. In some embodiments, the wall 100 may be an integral structure having a thickened portion to narrow the passageway 104 at the constricted region 106. In other embodiments, the thickened portion of the wall 100 may be implemented by a separate constriction device, such as a device 107, that abuts an inside surface 109 of the conduit 26 in the constricted region 106. The constriction device 107 may be placed in the passageway 104 of the conduit 26 by pumping or dropping the device 107 into the conduit 26 after the conduit 26 has been deployed in the well 10. Alternatively, the constriction device 107 may be pulled into the conduit 26 using the retractable line 30 or another line, such as a slickline. In some embodiments, the constricted region 106 may be located proximate the open end 33 of the conduit 26.

In the embodiment shown in FIG. 2, the inside surface 102 of the wall 100 in the constricted region 106 is configured such that it can engage with a blocking device 108, such as a plug for example. The plug 108 may be coupled to the line 30 so that, when the line 30 is deployed in the conduit 26, the plug 108 engages with the inside surface 102 of the wall 100 at the constricted region 106, thus preventing production of fluids through the conduit 26.

In some embodiments, and particularly in embodiments in which the plug 108 is coupled to the line 30, it may be desirable to provide a second blocking device 110, such as a second plug, to block the passageway 104 when the line 30 is retracted from the well 10 by the retraction system 38. The second plug 110 also may be coupled to the line 30. As the line 30 is retracted from the region of interest 12, the plug 108 may disengage from the constricted region 106, thus potentially opening the passageway 104 for production fluids. Thus, the second plug 110 may be coupled to the line 30 at a position at which it may engage with the inside surface 102 of the wall 100 at the constricted region 106 when the line 30 is retracted. For instance, the second plug 110 may be coupled at or near the end 36 of the line 30.

When the line 30 is deployed in the well 10, to ensure that the plug 108 maintains its engagement with the conduit 26, it may be desirable in some embodiments to add a fluid to the conduit 26 that has a higher density than the production fluid. Thus, for instance, one embodiment of the retractable sensor system 28 may include a second conduit 112 that is coupled to the conduit 26 through a port 114, which couples to the conduit 26 above the constricted region 106. The loop formed by the conduit 26, the port 114 and the second conduit 112 allows fluid 116 from a fluid reservoir 118 to circulate through the conduits 26 and 112 to keep the weight of the fluid column in the conduit 26 sufficient to maintain the plug 108 in engagement with the constricted region 106 and thus minimize the possibility of produced fluid flow in the conduit 26. As illustrated in FIG. 2, a valve 120 at the surface 11 may be used to add or remove the fluid 116 from the control line 26 or otherwise to control the circulation of the fluid 116.

In other embodiments, a loop for circulating the fluid 116 may be formed by placing the conduit 26 inside of a larger diameter conduit (not shown). In this embodiment, the fluid 116 may circulate using the annular space between the larger diameter conduit and the conduit 26.

Figure 3:
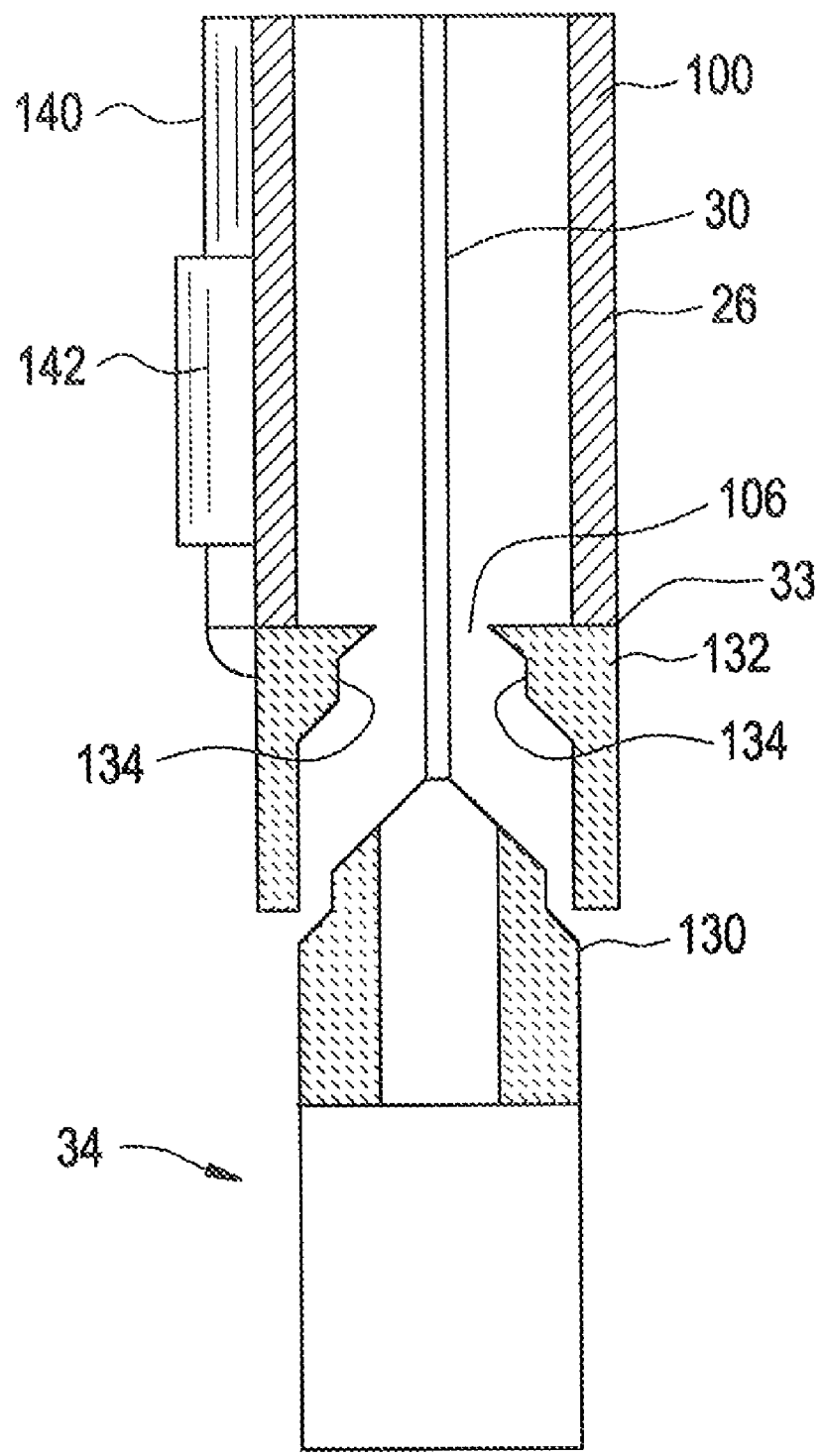
FIG. 3 is a schematic diagram of a retractable sensor system in accordance with another embodiment of the invention.

Another embodiment of a retractable sensor system 28 that may be deployed in a wellbore 14 is shown in FIG. 3. In this embodiment, the sensing portion 34 includes a nozzle portion 130 which is coupled to the line 30. A docking device 132 is located proximate the open end 33 of the conduit 26 and is configured to dock or engage with the nozzle portion 130 of the sensing portion 34. The docking device 132 also may be configured to provide the constricted region 106 of the conduit 26. In such an embodiment, when the line 30 is retracted and the sensing portion 34 is docked, the nozzle portion 130 engages with an inside surface 134 of the docking device 132 thus blocking the passage of production fluid through the conduit 26.

In some embodiments, the docking device 132 may simply be a passive docking device that engages with the sensing portion 34 when the line 30 is retracted, and the line 30 is used to communicate the information observed by the sensing portion 34 in the region of interest 12 to the surface 11. Alternatively, the docking device 132 may be configured to communicate with the sensing portion 34. For instance, as illustrated in the block diagram shown in FIG. 4, the sensing portion 34 may include a communication interface 136 configured to transmit and receive various signals, such as data, power, control signals, etc., to and from a communication interface 138 of the docking station 132. The communication interfaces 136 and 138 may be complementary connectors which electrically couple the sensing portion 34 to the docking station 132 when the sensing portion 34 is docked. In other embodiments, the communication interfaces 136 and 138 may be wireless interfaces and may include inductive couplers for instance. Other types of communication interfaces also are contemplated. The communication interfaces 136 and 138 may include other circuitry as appropriate to transmit and receive signals between the two interfaces 136 and 138. In addition, the communication interface 138 of the docking device 132 may include circuitry as appropriate to transmit and receive signals between the interface 138 and equipment located at the surface 11, such as the observation system 32.

In the embodiment illustrated in FIG. 3, the docking device 132 is coupled to a cable 140 having one or more electrical conductors, optical fibres, hydraulic connections, or any combination of connection formats. The cable 140 may be used to communicate information between the docking device 132 and the surface 11. In some embodiments, power conditioning circuitry 142 also may be coupled to the docking device 132 to appropriately condition power signals received from the surface 11 through the cable 140 to provide power to the docking device 132. For instance, the power conditioning circuitry 142 may include various converters, inverters, regulators, etc. to provide the appropriate form of electrical power depending on the particular application in which the retractable sensor system 28 is employed.

Figure 4:
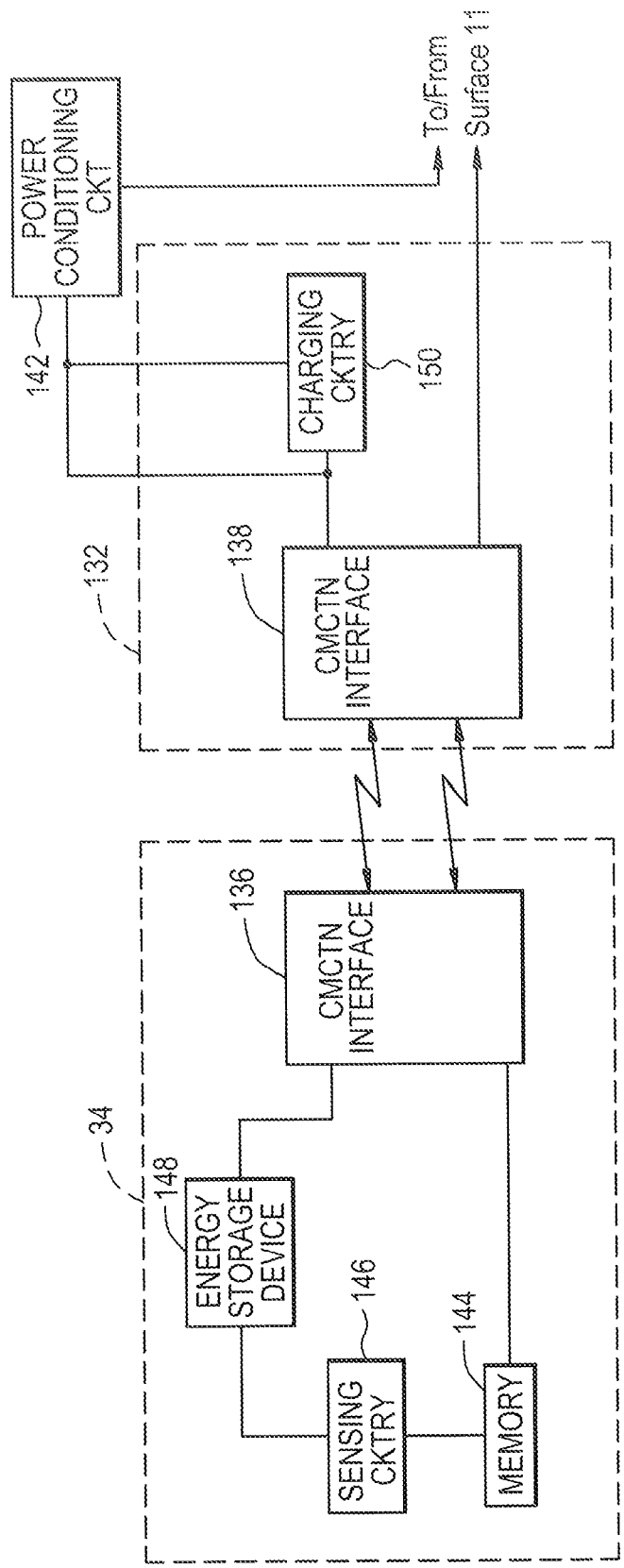
FIG. 4 is a block diagram of a sensing portion and a docking device in accordance with an embodiment of the invention.

Returning to the block diagram shown in FIG. 4, in some embodiments, the sensing portion 34 also may include a storage device or memory 144 for storing information observed by sensing circuitry 146. In such embodiments, the observed information may not be communicated to the surface 11 until after the sensing portion 34 is retracted from the region of interest 12 and docked with docking device 132.

The sensing portion 34 also may include an energy storage device 148, such as a battery, a capacitor bank, etc., to provide electrical power to the various components of the sensing portion 34 while the sensing portion 34 is deployed in the region of interest 12 of the well 10. The docking device 132 may also include charger circuitry 150 to charge the storage device 148 when the sensing portion 34 is docked with the docking device 132.

Referring now to FIG. 5, a flow diagram of a technique 200 employing the retractable sensor system 28 in a well 10 is illustrated. In accordance with the technique 200, the sensing portion 34 is deployed, using deployment system 38 for instance, into the conduit 26, through the open end 33, and into the region of interest 12 (block 202). More specifically, the line 30 together with sensing portion 34, such as one or more discrete sensors or a distributed sensor, are extended through the open end 33 and positioned in the well 10 in an appropriate location in which to observe a parameter, such as temperature, pressure, etc., associated with the region of interest 12 (block 204). The observed parameter may then be communicated to, for instance, the observation system 32 located at the surface 11 of the well 10 in real time. Alternatively, in embodiments in which the sensing portion 34 includes the memory 144 to store the observed information, the data may be communicated to the surface 11 at a later time, such as when the line 30 is retracted and the sensing portion 34 is docked with the docking station 132. In some embodiments, the observation system 32 may include various logging and storage devices to register and store the information observed by the sensing portion 34. The observed parameter may be communicated to the surface either optically or electrically using the line 30 or via the docking station 132 and the fixed cable 140 (block 206). In embodiments in which the sensing portion 34 is an optical fiber that is part of a DTS system, the observation system 32 may also include various other equipment associated with the DTS system, such as an optical time domain reflectometer, an optical receiver, etc.

During the lifetime of the well 10, various circumstances may arise in which it may be beneficial to perform further well operations, such as a well perforation, a well treatment, a cement squeeze job, etc., to optimize the production of the well 10. These operations typically involve lowering various types of equipment into the region of interest 12. To prevent interference with the well operation by the sensor system 28 and to prevent damage to the sensor system 28 that may result from performance of the well operation, the line 30 is retracted from the region of interest 12 (block 208) using, for instance, the retraction system 28. For instance, the retraction system 28 may pull the line 30 from the well 10 and wind the line 30 onto a spool. The line 30 may be retracted a distance until the sensing portion 34 is at least clear of the region of interest 12 but still below the surface 11 of the well 10. In some embodiment, to minimize the potential for interference with the well operation, the line 30 may be retracted such that the end 36 and/or the sensing portion 34 is contained within the conduit 26 (block 208). Alternatively, in embodiments which include the docking station 132, the line 30 is retracted a distance sufficient to dock the sensing portion 34 with the docking station 132. It should be understood that retraction of the line 30 may not be dependent on the desire to perform a well operation. For instance, particularly in embodiments which include the docking device 132, the line 30 may be retracted whenever the operator of the well 10 desires to download the information stored in the memory 144 of the sensing portion 34.

Once the sensing portion 34 has been retracted from the region of interest 12, the well operation may be performed (block 210). Upon completion of the well operation, the line 30 may be re-deployed such that the sensing portion 34 extends through the open end 33 of the conduit 26 and into the region of interest 12 (block 212). Once positioned at the desired location within the region of interest 12, the system 28 may once again be used to observe a parameter associated with the region of interest 12 (block 204) and communicate the observed parameter to the surface (block 206).

While the invention has been disclosed with respect to a limited number of embodiments, those skilled in the art, having the benefit of this disclosure, will appreciate numerous modifications and variations therefrom. For instance, multiple conduits may be provided, each of which may be used with a different retractable sensor system. In other embodiments, the line 30 may be used to perform functions other than communicating observed information to the surface. For instance, the line 30 may be used to actuate various devices, such as opening or closing a valve. As another example, the control line 26 also may be used to inject fluid into the well 10, such as chemical treatments, corrosion or scale inhibitors, or tracing substances. It is intended that the appended claims cover such modifications and variations as fall within the true spirit and scope of the invention.

What is claimed is:

1. A method usable with a well extending from a surface, comprising:
   disposing a line having a sensing portion in a conduit that extends into the well, the conduit having an open end located above a region of interest of the well;
   extending the sensing portion through the open end and into the region of interest;
   using the sensing portion to observe a parameter associated with the region of interest;
   communicating the observed parameter to the surface; and
   retracting the line into the conduit until the sensing portion is located above the region of interest and below the surface.

2. The method as recited in claim 1, wherein the observed parameter is communicated to the surface after the line is retracted.

3. The method as recited in claim 1, wherein the line is used to communicate the observed parameter to the surface.

4. The method as recited in claim 3, wherein the line comprises an electrical conductor to communicate the observed parameter.

5. The method as recited in claim 3, wherein the line comprises an optical fibre to communicate the observed parameter.

6. The method as recited in claim 1, comprising:
   performing a well operation in the region of interest while the line is retracted; and
   re-extending the sensing portion into the region of interest after completing the well operation.

7. The method as recited in claim 1, wherein the sensing portion comprises a discrete sensor.

8. The method as recited in claim 1, wherein the sensing portion comprises a distributed temperature sensor.

9. The method as recited in claim 1, comprising:
   blocking the conduit to prevent flow of a fluid present in the region of interest through the conduit.

10. The method as recited in claim 9, wherein blocking the conduit comprises:
    constricting a portion of the conduit;
    engaging a plug with the constricted portion to prevent flow of the fluid;
    providing a second conduit coupled to the conduit; and
    circulating a fluid between the second conduit and the conduit to maintain engagement of the plug with the constricted portion.

11. The method as recited in claim 1, comprising:
    providing a docking device proximate the open end of the conduit; and
    retracting the line until the sensing portion docks with the docking device.

12. The method as recited in claim 11, wherein the sensing portion comprises a storage device, and the method comprises:
    storing the observed parameter in the storage device; and
    communicating the stored observed parameter to the surface after the sensing portion docks with the docking device.

13. A retractable sensor system, comprising:
    a conduit disposed in a well that extends from a surface, the conduit having an open end disposed above a region of interest of the well; and
    a retractable line disposed in the conduit, the retractable line comprising a sensing portion to observe a parameter associated with the region of interest, wherein when the line is deployed in the conduit, the sensing portion extends through the open end and into the region of interest, and when the line is retracted, the sensing portion is located above the region of interest and below the surface.

14. The retractable sensor system as recited in claim 13, wherein the sensing portion comprises a discrete sensor coupled proximate an end of the retractable line.

15. The retractable sensor system as recited in claim 13, wherein the retractable line comprises an electrical conductor to communicate the observed parameter to the surface.

16. The retractable sensor system as recited in claim 13, wherein the retractable line comprises an optical fibre to communicate the observed parameter to the surface.

17. The retractable sensor system as recited in claim 13, comprising a plug to engage with an inside surface of the conduit to block flow of a production fluid through the conduit.

18. The retractable sensor system as recited in claim 17, wherein a portion of the inside surface defines a constricted portion of the conduit, and wherein the plug is coupled to the retractable line, and wherein, when the retractable line is deployed in the conduit, the plug engages with the constricted portion.

19. The retractable sensor system as recited in claim 17, comprising a second conduit coupled to the conduit to circulate a fluid between the second conduit and the conduit to maintain the plug in engagement with the inside wall.

20. The retractable sensor system as recited in claim 13, comprising a docking device located proximate the open end of the conduit, and wherein the sensing portion is configured to dock with the docking device when the retractable line is retracted; and
    wherein the sensing portion comprises a storage device to store the observed parameter and wherein the sensing portion communicates the stored observed parameter to the docking station when the sensing portion is docked.

21. A retractable sensor system for use in a well, comprising:
    a first conduit extending from a surface of the well, at least a portion of the first conduit comprising a constricted passageway, the first conduit having an open end located above a region of interest in the well;
    a retractable line disposed in the first conduit, the retractable line comprising a sensing portion; and a blocking device configured to engage with the first conduit at the constricted passageway, wherein, when the retractable line is deployed in the first conduit, the sensing portion extends from the open end and into the region of interest, and wherein, when the retractable line is retracted, the sensing portion is located above the region of interest and the blocking device engages with the first conduit at the constricted passageway to prevent flow of production fluid from the region of interest to the surface.

22. The system as recited in claim 21, comprising a second blocking device coupled to the retractable line, wherein, when the retractable line is deployed, the second blocking device engages with the conduit at the constricted passageway to prevent flow of production fluid from the region of interest to the surface;

and a second conduit coupled to the first conduit above the constricted passageway to circulate a fluid between the first and second conduits to prevent flow of production fluid from the region of interest to the surface.

23. The system as recited claim 21, comprising a docking device located proximate the open end of the conduit, the docking device configured to dock with the sensing portion when the retractable line is retracted.

24. The system as recited claim 23, wherein the sensing portion comprises a storage device to store the observed parameter, and the sensing portion communicates the stored observed parameter to the docking device when the sensing portion is docked.

25. The system as recited claim 23, wherein the sensing portion comprises the blocking device, and the blocking device engages with the first conduit at the constricted passageway when the sensing portion is docked with the docking device.

* * * * *